United States Patent
Taniguchi et al.

(10) Patent No.: US 9,281,125 B2
(45) Date of Patent: Mar. 8, 2016

(54) DIELECTRIC CERAMIC, MULTI-LAYER CERAMIC CAPACITOR AND METHOD OF MANUFACTURING THE SAME

(71) Applicant: TAIYO YUDEN CO., LTD., Taito-ku, Tokyo (JP)

(72) Inventors: Katsuya Taniguchi, Takasaki (JP); Tetsuo Shimura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 64 days.

(21) Appl. No.: 13/949,037

(22) Filed: Jul. 23, 2013

(65) Prior Publication Data
US 2014/0036407 A1 Feb. 6, 2014

(30) Foreign Application Priority Data
Jul. 31, 2012 (JP) .................. 2012-170364

(51) Int. Cl.
*H01G 4/12* (2006.01)
*C04B 35/468* (2006.01)
*H01G 4/30* (2006.01)

(52) U.S. Cl.
CPC .......... *H01G 4/1218* (2013.01); *C04B 35/4682* (2013.01); *H01G 4/1227* (2013.01); *H01G 4/30* (2013.01); *C04B 2235/3206* (2013.01); *C04B 2235/3217* (2013.01); *C04B 2235/3224* (2013.01); *C04B 2235/3236* (2013.01); *C04B 2235/3239* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01);

(Continued)

(58) Field of Classification Search
CPC . C04B 35/4682; H01G 4/1227; H01G 4/1418
USPC .................................. 501/134–139
See application file for complete search history.

(56) References Cited

U.S. PATENT DOCUMENTS 8,203,825 B2 * 6/2012 Azuma et al. .................. 361/313
2007/0142210 A1 * 6/2007 Muto et al. .................... 501/138

(Continued)

FOREIGN PATENT DOCUMENTS

| JP | 2010-258028 A | 11/2010 |
| JP | 2012138502 A | 7/2012 |
| WO | 2008132902 A | 11/2008 |

OTHER PUBLICATIONS

An Office Action issued by the Korean Patent Office, mailed Jul. 22, 2014, for Korean counterpart application No. 10-2013-0070231.

(Continued)

*Primary Examiner* — Karl Group
(74) *Attorney, Agent, or Firm* — Law Office of Katsuhiro Arai

(57) ABSTRACT

A dielectric ceramic is formed with sintered grains constituting the dielectric have an average grain size of 0.2 to 1.0 μm and an oxygen defect concentration of 0.2 to 0.5%. An acceptor element is added to the dielectric ceramic by no more than 0.5 mol per 100 mol of the primary component of $BaTiO_3$. The oxygen defect concentration is temporarily increased by reduction and sintering, after which the oxygen defect concentration is reduced through the subsequent re-oxidization process. Crystal strain generated in the re-oxidization process increases the dielectric constant.

4 Claims, 3 Drawing Sheets

(52) U.S. Cl.
CPC . *C04B2235/3281* (2013.01); *C04B 2235/3284* (2013.01); *C04B 2235/5445* (2013.01); *C04B 2235/652* (2013.01); *C04B 2235/6584* (2013.01); *C04B 2235/663* (2013.01); *C04B 2235/785* (2013.01)

(56) References Cited

U.S. PATENT DOCUMENTS

| | | | | |
|---|---|---|---|---|
| 2008/0297979 | A1* | 12/2008 | Aman et al. | 361/321.5 |
| 2010/0097740 | A1* | 4/2010 | Yamaguchi | 361/312 |
| 2010/0128414 | A1 | 5/2010 | Azuma et al. | |
| 2011/0195835 | A1* | 8/2011 | Kojima et al. | 501/138 |
| 2012/0033343 | A1 | 2/2012 | Yoon et al. | |
| 2012/0075770 | A1* | 3/2012 | Banno | 361/321.4 |
| 2012/0162854 | A1 | 6/2012 | Iwanaga | |
| 2013/0293320 | A1* | 11/2013 | Komatsu et al. | 333/202 |

OTHER PUBLICATIONS

A Notification of Reasons for Refusal issued by the Japanese Patent Office, mailed Apr. 30, 2014, for Japanese counterpart application No. 2012-170364.

A Notification of First Office Action issued by the State Intellectual Property Office of China, mailed Sep. 11, 2014, for Chinese counterpart application No. 201310329100.4.

* cited by examiner

DIELECTRIC CERAMIC, MULTI-LAYER CERAMIC CAPACITOR AND METHOD OF MANUFACTURING THE SAME

FIELD OF THE INVENTION

The present invention relates to a dielectric ceramic, and a multi-layer ceramic capacitor comprising a laminate of dielectric layers constituted by a dielectric ceramic, as well as method of manufacturing the dielectric ceramic and multi-layer ceramic capacitor of high dielectric constant.

DESCRIPTION OF THE RELATED ART

As mobile phones and other digital electronic devices are becoming increasingly smaller and thinner, multi-layer ceramic capacitors (MLCCs) that are surface-mounted on electronic circuit boards, etc., are also becoming smaller. According to the trend for smaller chips, the need for larger-capacity multi-layer ceramic capacitors has been increasing every year. Multi-layer ceramic capacitors are structured in such a way that dielectric layers constituted by dielectric ceramics are alternately layered with internal electrode layers.

In general, reducing the capacitor size invariably reduces the areas of the electrode layers facing the dielectric layers, resulting in a smaller capacitance. To make sure the capacitor provides enough capacitance despite a smaller chip size, therefore, high-density stacking technology is essential, which involves making the dielectric layers and electrode layers thinner and stacking them in multiple layers.

However, making the dielectric layers of the multi-layer ceramic capacitor thinner increases the probability at which leak current generates as a result of recombination of electric charges that have been polarized to the adjacent electrode layers. One possible reason why this leak current generates is the movement of carriers through oxygen defects in the crystal lattice constituting the dielectric layer (tunnel current effect) (refer to Patent Literature 1, for example).

Here, according to Patent Literature 1, for example, it is disclosed that leak current in the dielectric layer can be effectively suppressed by inserting an insulation film made of a perovskite complex oxide whose oxygen defect concentration is kept to $1.0 \times 10^{26}$ m$^{-3}$ or less (low-oxygen-defect insulation film) between the dielectric layer and the conductive film.

Incidentally, the low-oxygen-defect insulation film in Patent Literature 1 has a substance added to it, such as a rare earth element having a valence greater than that of the bivalent element at site A in the perovskite complex oxide expressed by the general formula $ABO_3$ (A represents a positive bivalent element, while B represents a positive tetravalent element), to achieve the oxygen defect concentration at a specified level or less.

Also in the conventional manufacturing process for multi-layer ceramic capacitors, the primary component of the dielectric layer, or $BaTiO_3$, for example, has an appropriate quantity of a substance added to it as an acceptor element, such as a metal oxide containing Mn, and the dielectric layer is sintered in a reducing ambience to turn the sintered grains constituting the dielectric into a so-called "core-shell structure" to reduce oxygen defects.

BACKGROUND ART LITERATURES

[Patent Literature 1] Japanese Patent Laid-open No. 2010-258028

SUMMARY

However, adding Mn or other acceptor element to a complex oxide of $BaTiO_3$, for example, leads to sintering in a solid solution state where some of the Ti sites of the crystal lattice in the shell of crystal grains are substituted by Mn. In this case, the greater the quantity of acceptor element added, the more the generation of oxygen defects is suppressed. In the meantime, the probability also increases that the lattice constant and orientation vary according to the Mn-substituted quantity and substitution position in the crystal shells contacting each other, consequently suppressing the grain growth due to sintering. In other words, adding a larger quantity of acceptor element with the aim of reducing the quantity of oxygen defects reduces the grain size of dielectric crystal and the resulting sizing effect causes the dielectric constant to drop, which presents a problem.

The present invention was developed to solve the aforementioned problem and an object of the present invention is to provide a dielectric ceramic and multi-layer ceramic capacitor that allow for reduction of the oxygen defect concentration in the dielectric and also ensure a sufficiently high dielectric constant, as well as method of manufacturing such dielectric ceramic and multi-layer ceramic capacitor.

To solve the aforementioned problem, the present invention provides a dielectric ceramic whose sintered grains constituting the dielectric have an average grain size of 0.2 to 1.0 µm and oxygen defect concentration of 0.2 to 0.5%.

Preferably the dielectric ceramic contains $ABO_3$ (A represents an element containing Ba, while B represents an element containing Ti) as the primary component of the dielectric, where an acceptor element is contained by p mol per 100 mol of $ABO_3$ and the letter p representing the mol number of the acceptor element is in a range of $0 < p \le 0.5$. The letter p representing the mol number of the acceptor element is more preferably in a range of $0 < p \le 0.3$ and even more preferably in a range of $0 < p \le 0.15$.

Preferably the acceptor element in the dielectric ceramic is at least one type of element, or a mixture of two or more types of elements, selected from a group that includes Sc, Cr, Mn, Fe, Co, Ni, Cu, Zn, Mg, Al, Dy, Ho, Er, Yb, and Lu.

Additionally, the present invention provides a multi-layer ceramic capacitor comprising dielectric layers alternately stacked with electrode layers, wherein the multi-layer ceramic capacitor is such that the sintered grains constituting the dielectric layer have an average grain size of 0.2 to 1.0 µm and oxygen defect concentration of 0.2 to 0.5%.

Preferably the multi-layer ceramic capacitor contains $ABO_3$ (A represents an element containing Ba, while B represents an element containing Ti) as the primary component of the dielectric layer, where an acceptor element is contained by p mol per 100 mol of $ABO_3$ and the letter, p representing the mol number of the acceptor element is in a range of $0 < p \le 0.5$. The letter p representing the mol number of the acceptor element is more preferably in a range of $0 < p \le 0.3$ and even more preferably in a range of $0 < p \le 0.15$.

Preferably the acceptor element in the multi-layer ceramic capacitor is at least one type of element, or a mixture of two or more types of elements, selected from a group that includes Sc, Cr, Mn, Fe, Co, Ni, Cu, Zn, Mg, Al, Dy, Ho, Er, Yb and Lu.

Furthermore, the present invention provides a method of manufacturing a dielectric ceramic including: a step to sinter a dielectric in a reducing ambience where the primary component of the dielectric is $ABO_3$ (A represents an element containing Ba, while B represents an element containing Ti), an acceptor element is contained by p mol per 100 mol of $ABO_3$ and the letter p representing the mol number of the acceptor element is in a range of 0<p≤0.5; and a step to oxidize the sintered dielectric in an oxidizing ambience to reduce the oxygen defect concentration of the sintered grains constituting the dielectric.

Under the method of manufacturing a dielectric ceramic, the letter p representing the mol number of the acceptor element is more preferably in a range of 0<p≤0.3 and even more preferably in a range of 0<p≤0.15.

Under the method of manufacturing a dielectric ceramic, preferably the sintered grains constituting the dielectric ceramic have an average grain size of 0.2 to 1.0 μm and oxygen defect concentration of 0.2 to 0.5%.

Under the method of manufacturing a dielectric ceramic, preferably the acceptor element in the dielectric ceramic is at least one type of element, or a mixture of two or more types of elements, selected from a group that includes Sc, Cr, Mn, Fe, Co, Ni, Cu, Zn, Mg, Al, Dy, Ho, Er, Yb, and Lu.

Moreover, the present invention provides a method of manufacturing a multi-layer ceramic capacitor including: a step to prepare a dielectric green sheet whose primary component is $ABO_3$ (A represents an element containing Ba, while B represents an element containing Ti) and which contains an acceptor element by no more than 0.5 mol per 100 mol of $ABO_3$; a step to print a conductive paste on the dielectric green sheet to provide an internal electrode layer; a step to stack the dielectric green sheets on which the conductive paste has been printed, to form a capacitor laminate; a step to sinter the capacitor laminate in a reducing ambience; and a step to oxidize the sintered capacitor laminate in an oxidizing ambience to reduce the oxygen defect concentration of the sintered grains constituting the dielectric layer in the capacitor laminate.

Under the method of manufacturing a multi-layer ceramic capacitor, the mol number of the acceptor element is more preferably no more than 0.3 mol and even more preferably no more than 0.15 mol per 100 mol of $ABO_3$.

Under the method of manufacturing a multi-layer ceramic capacitor, preferably the sintered grains constituting the dielectric layer have an average grain size of 0.2 to 1.0 μm and oxygen defect concentration of 0.2 to 0.5%.

Under the method of manufacturing a multi-layer ceramic capacitor, preferably the acceptor element is at least one type of element, or a mixture of two or more types of elements, selected from a group that includes Sc, Cr, Mn, Fe, Co, Ni, Cu, Zn, Mg, Al, Dy, Ho, Er, Yb, and Lu.

According to the present invention, the oxygen defect concentration in the dielectric can be reduced and a sufficient dielectric constant can also be ensured.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
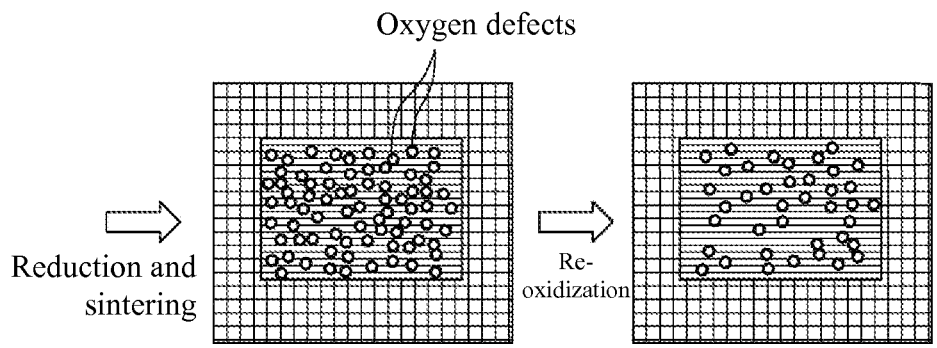
FIG. 1 is a schematic view showing how the oxygen defect concentration changes in the manufacturing process of a dielectric ceramic in an embodiment of the present invention.
Figure 1:
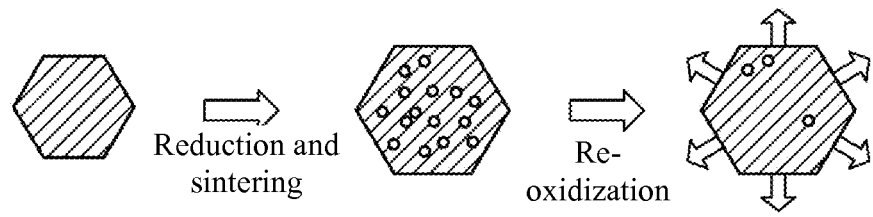

| | |
|---|---|
| 1 | Multi-layer ceramic capacitor |
| 10 | Sintered compact |
| 12 | Dielectric layer (dielectric ceramics) |
| 13 | Internal electrode layer |
| 15 | Cover layer |
| 20 | External electrode |

DETAILED DESCRIPTION OF EMBODIMENTS

With the dielectric ceramic in an embodiment of the present invention, the oxygen defect concentration in the dielectric is controlled to a range of 0.2 to 0.5%. The crystal grains constituting the dielectric may be a perovskite complex oxide expressed by the general formula $ABO_3$ (where site A has an element containing Ba, for example, while site B has an element containing Ti, for example).

In addition, the primary component of the dielectric ceramic is $BaTiO_3$, for example, and an acceptor element is contained by p mol per 100 mol of $BaTiO_3$. Here, preferably the letter p representing the mol number of the acceptor element is in a range of 0<p≤0.5. The letter p representing the mol number of the acceptor element is more preferably in a range of 0<p≤0.3 and even more preferably in a range of 0<p≤0.15.

Preferably the acceptor element to be added to the dielectric is at least one type of element, or a mixture of two or more types of elements, selected from a group that includes Sc, Cr, Mn, Fe, Co, Ni, Cu, Zn, Mg, Al, Dy, Ho, Er, Yb, and Lu. Here, Sc, Cr, Mn, Fe, Co, Ni, Cu, Zn, Mg, and Al are non-rare earth elements, while Dy, Ho, Er, Yb, and Lu are rare earth elements.

The dielectric ceramic in this embodiment is manufactured as follows. First, the aforementioned acceptor element of relatively low concentration is added to the material powder constituting the primary component of the dielectric. For example, 0.1 to 1.0 mol of an acceptor constituted by MgO and $Ho_2O_3$ may be added per 100 mol of the dielectric material powder of $BaTiO_3$. Similarly, it is also possible to add approx. 0.2 mol of $V_2O_3$ per 100 mol of $BaTiO_3$.

Thereafter, the above mixture is wet-mixed and then dried and crushed and the prepared dielectric material powder is sintered for approx. 1 hour in a reducing ambience containing $N_2$, etc. (at a partial oxygen pressure of $1.0\times10^{-9}$ hPa, for example) in a temperature range of 1180 to 1230° C. by adjusting the conditions as deemed appropriate. Preferably the grains constituting the dielectric are grown by at least 1.2 times in average grain size during sintering. In other words, preferably the relationship of "Average grain size after sintering≤1.2×Average grain size of material powder" is satisfied. Preferably the average grain size of the sintered dielectrics is 0.2 to 1.0 μm.

By reducing and sintering the dielectric of a material composition that contains an acceptor element of relatively low concentration as described above, the crystal lattice constituting the dielectric will temporarily have a large quantity of oxygen defects. To reduce the oxygen defect concentration to a range of 0.2 to 0.5% as mentioned above, the sintered dielectric is re-oxidized in an oxidizing ambience (at a partial oxygen pressure of $1.0\times10^{-2}$ hPa, for example) at approx. 900° C.

A dielectric crystal having many oxygen defects has a greater lattice constant compared to a crystal having fewer oxygen defects. On the other hand, supplying oxygen to the oxygen defect sites through the oxidization process lowers the lattice constant again, causing tensile stress to act upon the shell of the dielectric crystal having a core-shell structure, resulting in an increase in dielectric constant (refer to FIG. 1).

Various studies in the art report that, when tensile stress is added to a perovskite oxide dielectric crystal, its dielectric constant will increase (e.g., "Modulation of Dielectric Constant on Mechanically Strained $SrTiO_3$ MIN Capacitor (Process Science and New Process Technologies)," Kuroki, Technical Report of the Institute of Electronics, Information and Communication Engineers, Silicon Device and Materials 107 (254), 2007). As shown in FIG. 1, the dielectric ceramic in this embodiment is reduced and sintered based on a material composition that contains an acceptor element of low concentration to temporarily promote production of oxygen defects in the crystal, after which the oxygen defects are reduced to the specified range of concentrations through the subsequent oxidization process. In the example of the present invention explained below, it was also confirmed that a high dielectric constant would be obtained by changing the lattice constant of the dielectric crystal in the re-oxidization process to produce internal strain.

EXAMPLE

Figure 2:
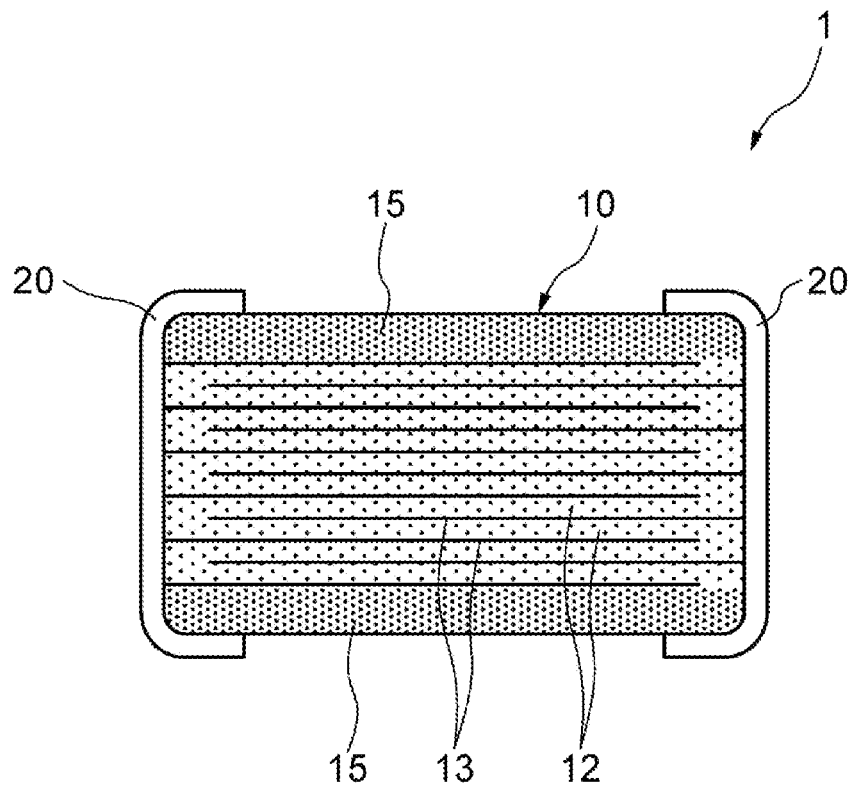
FIG. 2 is a longitudinal section view showing a rough structure of a multi-layer ceramic capacitor.

Next, an example of a multi-layer ceramic capacitor is explained, where dielectric layers to which a dielectric ceramic (MLCC) having such characteristics is applied are stacked at high density. FIG. 2 is a longitudinal section view showing a rough structure of a prototype multi-layer ceramic capacitor 1. The multi-layer ceramic capacitor 1 comprises a sintered compact 10 having chip dimensions and shape specified by the standard (such as a rectangular solid of 1.0 mm×0.5 mm×0.5 mm) and a pair of external electrodes 20, 20 formed on both sides of the sintered compact 10. The sintered compact 10 is comprised of many dielectric layers 12 constituted by dielectric ceramics stacked alternately with many internal electrode layers 13 (there are 100 layers in the example), and cover layers 15 are formed as the outermost layers of the foregoing. The dielectric layers 12 and cover layers 15 contain $BaTiO_3$ (hereinafter referred to as "BT") as the primary component, while the internal electrode layers 13 are sintered from Ni as the primary component, for example.

The sintered compact 10 of the multi-layer ceramic capacitor 1 is formed in such a way that the thickness of one dielectric layer 12 sandwiched by two internal electrode layers 13 becomes approx. 0.1 μm and that the thickness of the internal electrode layer 13 becomes approx. 0.6 μm. The cover layers 15 formed as the outermost layers of the sintered compact 10 are intended to protect the dielectric layers 12 and internal electrode layers 13 from contamination due to outside humidity, contaminants, etc., and thereby prevent their deterioration over time.

The multi-layer ceramic capacitor 1 is manufactured by the following process, for example.

<Creation of MLCC>

(1) Preparation of Dielectric Material Powder

First, $BaTiO_3$ powder (BT material powder) was used as the primary component material of the dielectric ceramic to constitute the dielectric layer 12 of the multi-layer ceramic capacitor 1. The average grain size of the BT material powder (BT size) was 100 nm (=0.1 μm). The BT size was obtained by observing the powder with a scanning electron microscope (SEM) and taking the median size of randomly selected 500 samples.

An acceptor constituted by MgO and $Ho_2O_3$ was added under varying conditions by 0.1 to 1.0 mol per 100 mol of BT being the primary component of the dielectric layer 12. As shown in Table 1, the mol quantity ratio of Ho and Mg was roughly 1:1, representing equal quantities, under Conditions 1 to 6. Additionally, the added quantity of Ho in mol shown in Table 1 represents an equivalent one-molecule, one-atom quantity as $HoO_{3/2}$. Similarly, $V_2O_3$ was added by 0.2 mol per 100 mol of $BaTiO_3$.

(2) Preparation of MLCC Molding

The prepared dielectric material powder was wet-mixed using polyvinyl acetal resin and organic solvent, after which the mixture was applied onto a ceramic green sheet of 1.0 μm in thickness according to the doctor blade method and then dried. The ceramic cover sheet to constitute the cover layer 15 was adjusted to 10 μmin thickness. Also, a Ni conductive paste was screen-printed to a specified pattern on the green sheet to constitute the dielectric layer 12, to provide an internal electrode layer 13. The thickness of the internal electrode layer 13 was approx. 0.5 to 0.6 μm.

Then, 101 green sheets having the Ni conductive paste on them were stacked so that the number of stacked dielectric layers 12 n would become 100, after which 20 cover sheets of 10 μmin thickness each were pressure-bonded on each of the top and bottom of the laminate, followed by cutting of the laminate to 1.0 mm×0.5 mm. Thereafter, a Ni conductive paste to constitute the external electrodes 20 was applied on both sides of the laminate and then dried to obtain a MLCC molding. All of the prepared capacitors 1 had the same chip dimensions of 1.0 mm×0.5 mm×0.5 mm (size 1005).

(3) Sintering of MLCC Molding

The MLCC molding sample was put in a $N_2$ ambience to remove the binder, and then sintered for 1 hour in the presence of a reducing mixture gas containing $N_2$, $H_2$ and $H_2O$ (at a partial oxygen pressure of $1.0\times10^{-9}$ hPa) under the condition of 1180 to 1230° C. Temperature was raised and lowered at a rate of 3000° C./h during the sintering process. Preferably the grains constituting the dielectric are grown by at least 1.2 times in average grain size during sintering. In other words, preferably the relationship of "Average grain size after sintering≤1.2×Average grain size of material powder" is satisfied. Clearly under Conditions 1 to 6 in Table 1, sintering was promoted by the low concentration of the acceptor composition ratio, causing the average crystal grain size of the dielectric to grow by approx. 4.4 to 4.6 times.

(4) Re-oxidization of Sintered Compact of MLCC

By reducing and sintering the sintered compact 10 of MLCC containing the acceptor element of low concentration as described above, the dielectric layer 12 temporarily contained a large quantity of oxygen defects. Accordingly, to reduce the oxygen defect concentration, the sintered compact of MLCC was re-oxidized in an oxidizing ambience (at a partial oxygen pressure of $1.0 \times 10^{-2}$ hPa, for example) at approx. 900° C.

<Evaluation Methods>

(1) Measurement of Oxygen Defect Concentration

The sintered and re-oxidized multi-layer ceramic capacitor 1 was left to stand for 1 hour in a thermostatic chamber adjusted to 150° C., and then left to stand for another 24 hours at a room temperature of 25° C. After annealing the sample to adjust the conditions, the oxygen defect concentration of the dielectric layer 12 (oxygen defect concentration relative to the oxygen in the primary component of BT) was measured using the TEM-EELS method.

(2) Evaluation Method of Grain Size

The multi-layer ceramic capacitor 1 sample was partially polished to expose its section and the section was captured with a scanning electron microscope (SEM), after which the captured micrograph was used to measure the grain size of dielectric sintered grains. In this Specification, "grain size" is defined as the average maximum length of sintered crystal grains in the direction parallel with the internal electrode layer (i.e., direction crossing at right angles with the direction of electric field). During the sampling of dielectric sintered grains to measure the grain size, at least 500 samples were randomly taken. If 500 or more grains were found in one observed area (such as on one micrograph taken by the SEM at 2000 magnification), all of the dielectric grains were sampled. If fewer than 500 grains were found, on the other hand, multiple locations were randomly observed (captured) until at least 500 grains were found.

(3) Measurement of Dielectric Constant

An impedance analyzer was used to measure the capacitance Cm of the multi-layer ceramic capacitor 1. The voltage application condition for measurement was set to 1 kHz, 1.0 Vrms. Formula (1) below was applied to the measured capacitance Cm to obtain the specific dielectric constant $\in$:

$$Cm = \in \times \in_0 \times n \times S/t \quad \text{Formula (1)}$$

Here, $\in_0$ represents the dielectric constant in vacuum, while $\in$, S and t represent the number of stacked dielectric layers n, area of the internal electrode layer, and thickness of one dielectric layer, respectively.

<Evaluation Results>

The evaluation results of multi-layer ceramic capacitor 1 samples prepared under the respective conditions are explained. It should be noted that the added quantity of acceptor (added quantity of Ho and added quantity of Mg) shown in Table 1 represents an equivalent mol number per 100 mol of $BaTiO_3$, obtained by crushing the multi-layer ceramic capacitor 1 and detecting quantitative data for each component based on ICP (inductively coupled plasma) analysis, and then converting the quantitative data of each component relative to the quantitative data of $BaTiO_3$.

TABLE 1

| Condition | Added quantity of Ho (mol) | Added quantity of Mg (mol) | Added quantity of acceptor (Ho + Mg) (mol) | Sintering temperature (° C.) | Oxygen defect concentration (%) - as annealed | Average grain size (μm) | Specific dielectric constant |
|---|---|---|---|---|---|---|---|
| 1 | 0.05 | 0.05 | 0.10 | 1180 | 0.5 | 0.45 | 8244 |
| 2 | 0.08 | 0.07 | 0.15 | 1190 | 0.4 | 0.43 | 8006 |
| 3 | 0.15 | 0.15 | 0.30 | 1200 | 0.3 | 0.43 | 7523 |
| 4 | 0.25 | 0.25 | 0.50 | 1215 | 0.3 | 0.46 | 7099 |
| 5 | 0.30 | 0.30 | 0.60 | 1220 | 0.2 | 0.46 | 5984 |
| 6 | 0.50 | 0.50 | 1.00 | 1230 | 0.1 | 0.44 | 5554 |

Note)
The Ho quantity represents an equivalent one-molecule, one-atom quantity.

Figure 3:
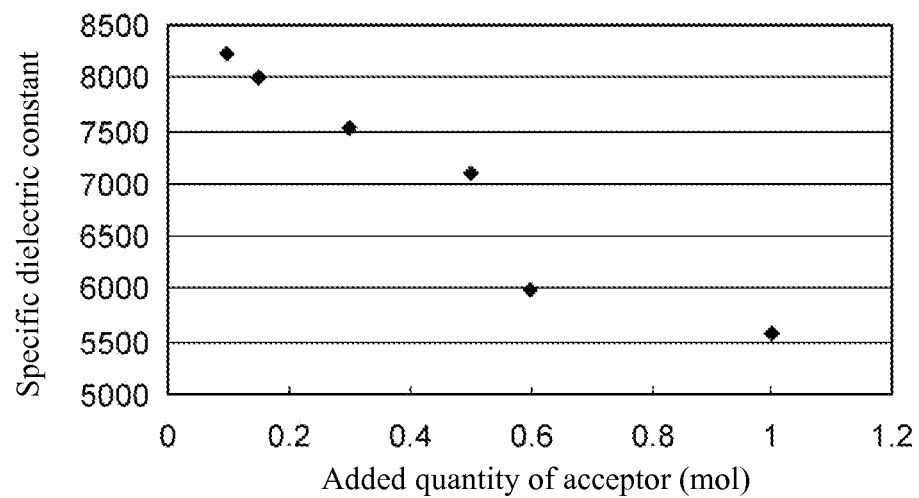
FIG. 3 is a graph showing the relationship of added quantity of acceptor and specific dielectric constant pertaining to a dielectric layer constituted by dielectric ceramics.
Figure 4:
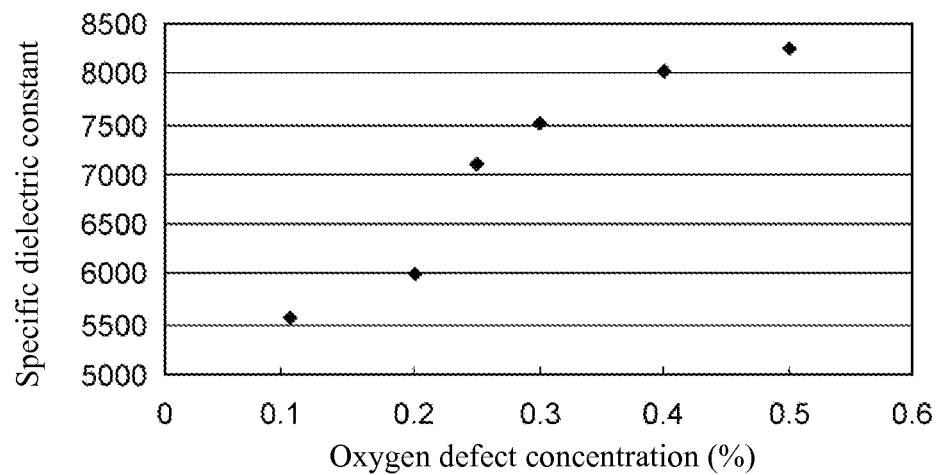
FIG. 4 is a graph showing the relationship of oxygen defect concentration and specific dielectric constant pertaining to a dielectric layer constituted by dielectric ceramics.

FIG. 3 shows the relationship of added quantity of acceptor and specific dielectric constant based on the results in Table 1, pertaining to the dielectric layer 12 constituted by the dielectric ceramic. Similarly, FIG. 4 shows the relationship of oxygen defect concentration and specific dielectric constant based on the results in Table 1.

As shown in FIG. 3, a high dielectric constant of 4000 or more was invariably confirmed when the added quantity of acceptor was in a range of 0.1 to 1.0 percent by mol relative to the primary component BT of the dielectric ceramic (dielectric layer 12). Also, FIG. 3 indicates a trend that the smaller the added quantity of acceptor in the dielectric layer 12, the more the sintering is promoted and higher the dielectric constant becomes. In this example, the oxygen defect concentration could be reduced and sufficiently high dielectric constant ensured due to the re-oxidization process, even when the added quantity of acceptor was smaller than what is traditionally added (refer to FIG. 4). Furthermore, leak current of the multi-layer ceramic capacitor product can be reduced and good voltage endurance characteristics achieved by suppressing the oxygen defect concentration.

Figure 5:
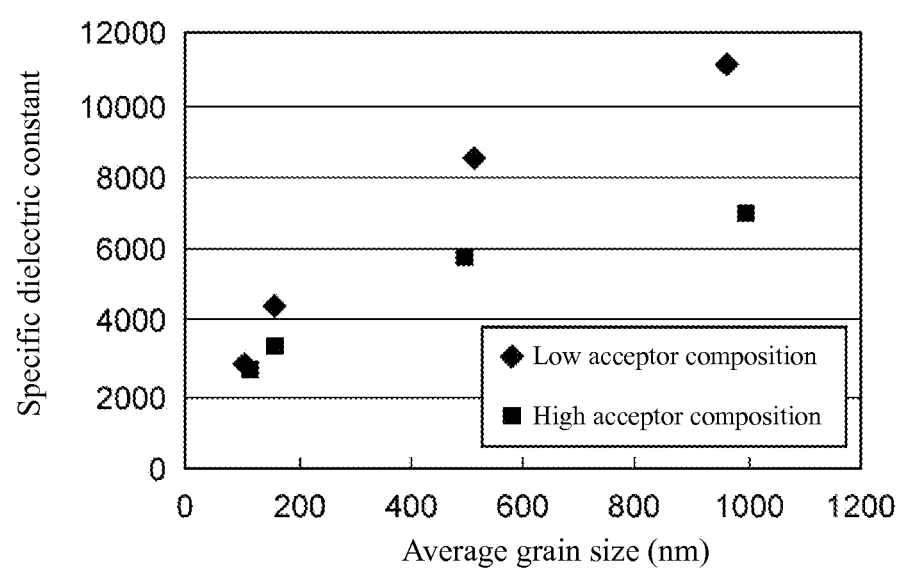
FIG. 5 is a graph showing the relationship of average crystal grain size and specific dielectric constant, relative to an acceptor concentration parameter, pertaining to a dielectric layer constituted by dielectric ceramics.

In the meantime, FIG. 5 is a graph showing the relationship of average grain size and specific dielectric constant, pertaining to the dielectric layer 12 constituted by the dielectric ceramic, at two different parameter values of 0.15 mol (low acceptor concentration) and 0.6 mol (high acceptor concentration) representing the added quantity of acceptor per 100 mol of BT. As shown in FIG. 5, the dielectric constant at the low acceptor concentration began to differ from that at the high acceptor concentration at the average grain size of 200 nm (=0.2 μm) and the difference became more prominent as the average grain size increased.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-170364, filed Jul. 31, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A dielectric ceramic whose sintered grains constituting dielectric have an average grain size of 0.2 to 1.0 μm and an oxygen defect concentration of more than 0.2% but no more than 0.5%, wherein the dielectric contains barium titanate and an oxide of an acceptor element which includes one or more of non-rare earth elements selected from the group consisting of Sc, Cr, Mn, Fe, Co, Ni, Cu, Zn, Mg, and Al, as well as one or more of rare earth elements selected from the group consisting of Dy, Ho, Er, Yb, and Lu, where all barium-containing titanate contained in the dielectric is represented by chemical formula $Ba_1Ti_1O_3$, and the acceptor element is contained by p mol per 100 mol of $Ba_1Ti_1O_3$, and p representing p mol number of the acceptor element is in a range of $0<p\leq0.5$.

2. A multi-layer ceramic capacitor comprising dielectric layers alternately stacked with electrode layers, wherein sintered grains constituting the dielectric layers have an average grain size of 0.2 to 1.0 μm and an oxygen defect concentration of more than 0.2% but no more than 0.5%, wherein the dielectric layer contains barium titanate with chemical formula $Ba_1Ti_1O_3$ and an oxide of an acceptor element which includes one or more of non-rare earth elements selected from the group consisting of Sc, Cr, Mn, Fe, Co, Ni, Cu, Zn, Mg, and Al, as well as one or more of rare earth elements selected from the group consisting of Dy, Ho, Er, Yb, and Lu, where all barium-containing titanate contained in the dielectric is represented by chemical formula $Ba_1Ti_1O_3$, and the acceptor element is contained by p mol per 100 mol of $Ba_1Ti_1O_3$, and p representing p mol number of the acceptor element is in a range of $0<p\leq0.5$.

3. A dielectric ceramic according to claim 1, wherein the acceptor element is a combination of Mg as the non-rare earth element and Ho as the rare earth element.

4. A multi-layer ceramic capacitor according to claim 2, wherein the acceptor element is a combination of Mg as the non-rare earth element and Ho as the rare earth element.

* * * * *